United States Patent
Liao

(10) Patent No.: US 10,735,703 B2
(45) Date of Patent: Aug. 4, 2020

(54) ELECTRONIC DEVICE AND ASSOCIATED IMAGE PROCESSING METHOD

(71) Applicant: MEDIATEK INC., Hsinchu (TW)

(72) Inventor: Yaozhi Liao, Hsinchu (TW)

(73) Assignee: MEDIATEK INC., Hsinchu (TW)

( * ) Notice: Subject to any disclaimer, the term of this patent is extended or adjusted under 35 U.S.C. 154(b) by 0 days.

(21) Appl. No.: 16/541,326

(22) Filed: Aug. 15, 2019

(65) Prior Publication Data

US 2020/0107001 A1 Apr. 2, 2020

(30) Foreign Application Priority Data

Oct. 1, 2018 (TW) .............................. 107134669 A

(51) Int. Cl.
| | |
|---|---|
| *H04N 9/68* | (2006.01) |
| *H04N 9/31* | (2006.01) |
| *H04N 9/64* | (2006.01) |
| *H04N 9/75* | (2006.01) |
| *H04N 9/76* | (2006.01) |

(52) U.S. Cl.
CPC .............. *H04N 9/68* (2013.01); *H04N 9/3182* (2013.01); *H04N 9/646* (2013.01); *H04N 9/75* (2013.01); *H04N 9/76* (2013.01)

(58) Field of Classification Search
CPC ........ H04N 9/68; H04N 9/3182; H04N 9/646; H04N 9/75; H04N 9/76
See application file for complete search history.

(56) References Cited

U.S. PATENT DOCUMENTS

| | | | |
|---|---|---|---|
| 8,077,259 B2 | 12/2011 | Zhang et al. | |
| 8,781,225 B2 | 7/2014 | Hsu | |
| 2006/0239581 A1 | 10/2006 | Neuman | |
| 2018/0041801 A1* | 2/2018 | Owaki | G09G 5/10 |
| 2019/0189049 A1* | 6/2019 | An | G06T 7/90 |

FOREIGN PATENT DOCUMENTS

| | | |
|---|---|---|
| CN | 101843103 A | 9/2010 |
| TW | 201319835 A | 5/2013 |

* cited by examiner

*Primary Examiner* — Michael E Teitelbaum
(74) *Attorney, Agent, or Firm* — McClure, Qualey & Rodack, LLP

(57) ABSTRACT

An electronic device and an associated image processing method are disclosed. The method includes: receiving an image to be processed, and determining whether the image to be processed is a non-standard image; when the determination result is affirmative, automatically converting the image to be processed as a non-standard image into a standard image adapted to a signal output range of the electronic device; and outputting the standard image. With the above method, a non-standard image can be converted to a standard image and outputted without involving manual adjustment of a user, thereby improving image output effects of the electronic device and satisfying user utilization requirements.

12 Claims, 6 Drawing Sheets

- S11: Receive image to be processed and determine whether image to be processed is non-standard image
- S12: When determination result of affirmative, automatically convert image to be processed as non-standard image into standard image adapted to signal output range of electronic device
- S13: Output standard image

ELECTRONIC DEVICE AND ASSOCIATED IMAGE PROCESSING METHOD

This application claims the benefit of Taiwan application Serial No. 107134669, filed Oct. 1, 2018, the subject matter of which is incorporated herein by reference.

BACKGROUND OF THE INVENTION

Field of the Invention

The present application relates to the technical field of computers, and more particularly to an electronic device and an associated image processing method.

Description of the Related Art

An electronic device such as a television has a certain signal output range when outputting images; that is, only signals within the signal output range can be normally outputted, otherwise normal display on a screen cannot be performed if an output image includes ultra-black signals or ultra-white signals.

In the prior art, to process ultra-black or ultra-white signals, a user usually needs to be notified of the ultra-black or ultra-white signals included in a current image (e.g., indicated in a video source), and manual adjustment is carried out by the user to further perform normal display on a screen.

However, it is discovered through long-term research and development that, most video sources do not specify such indication of ultra-black or ultra-white signals, and a user at this point can only attempt manual adjustment once having discovered image saturation. Further, even if the ultra-black signals and ultra-white signals can be displayed after the manual adjustment, signals within the normal signal output range are inevitably affected and may not be displayed normally. Thus, the above conventional approach is not at all intelligent and has poor efficiency, and fails to meet user utilization requirements.

SUMMARY OF THE INVENTION

The present application primarily solves a technical issue of how to provide an electronic device and an associated image processing method capable of automatically converting a non-standard image into a standard image and outputting the standard image without involving manual adjustment of a user, thereby improving image output effects of the electronic device and satisfying user utilization requirements.

To solve the above technical issue, the present application provides an image processing method of an electronic device. The method includes: receiving an image to be processed, and determining whether the image to be processed is a non-standard image; when the determination result is affirmative, automatically converting the image to be processed as the non-standard image into a standard image adapted to a signal output range of the electronic device; and outputting the standard image.

To solve the above technical issue, the present application provides an electronic device including a processor and a memory. The processor is coupled to the memory. The memory is stored with an image processing program. When the image processing program is executed by the processor, the processor performs steps of: receiving an image to be processed, and determining whether the image to be processed is a non-standard image; when the determination result is affirmative, automatically converting the image to be processed as the non-standard image into a standard image adapted to a signal output range of the electronic device; and outputting the standard image.

The prevent application provides the following effects. Different from the prior art, the image processing method of an electronic device includes: receiving an image to be processed, and determining whether the image to be processed is a non-standard image; when the determination result is affirmative, automatically converting the image to be processed as the non-standard image into a standard image adapted to a signal output range of the electronic device; and outputting the standard image. With the above method, when an electronic device of the present application processes an image, a non-standard image that cannot be normally outputted can be converted to a standard image that can then be outputted without involving manual adjustment of a user, thereby improving image output effects of the electronic device and satisfying user utilization requirements.

BRIEF DESCRIPTION OF THE DRAWINGS

To better illustrate the technical solutions of the embodiments of the present application, drawings associated with the embodiments are briefly described below. It is obvious that, the accompanying drawings below depict merely some embodiments of the present application, and a person could easily derive other drawings on the basis of these accompanying drawings without involving inventive skills.

DETAILED DESCRIPTION OF THE INVENTION

Figure 1:
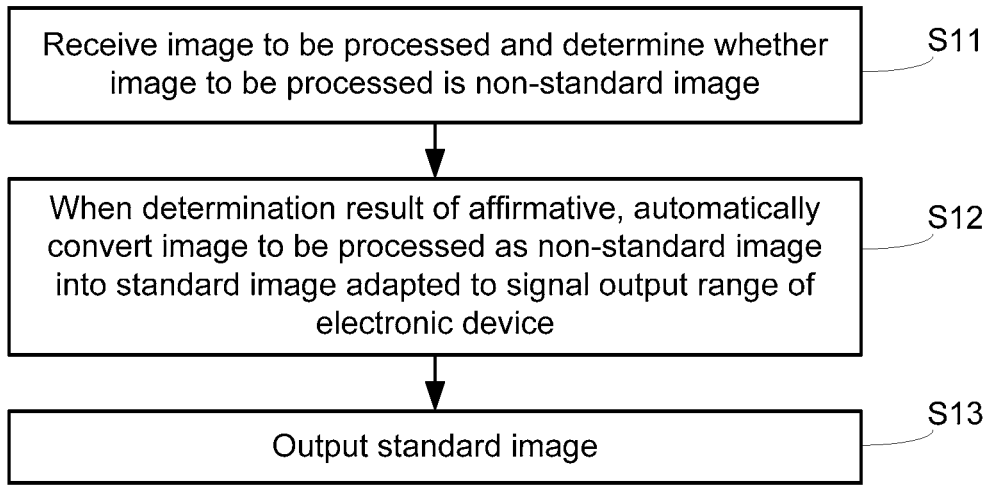
FIG. 1 is a flowchart of an image processing method of an electronic device according to an embodiment of the present application.

Details of associated prior art are first briefly introduced before describing the present application.

A current color television usually adopts a YCbCr color space to receive luminance signals and chrominance signals. The normal signal range of luminance signals Y is 64 to 940; that is, the signal output range of Y signals that can be outputted by a television is 64 to 90, signals in values 0 to 63 that are smaller than the range are ultra-black signals, and signals in values 941 to 1023 greater than the range are ultra-white signals. Such ultra-black signals and ultra-white signals outside the normal range cannot be normally outputted by the television.

In some application scenarios, ultra-white signals and ultra-black signals can be substituted by signals within the signal output range and be accordingly outputted in substitution. When ultra-black signals within the range 0 to 63 are processed, the corresponding ultra-black signals can be regarded as signals in a value 64 and be outputted; when ultra-white signals within the range 941 to 1023 are processed, the corresponding ultra-white signals can be regarded as signals in a value 940 and be outputted. However, the above output method causes deviations in the image displayed by a screen of an electronic device from a real image, resulting in degraded display quality and undesirably affecting user perception experience.

Currently, to solve the above technical problem, a key for processing ultra-black signals and ultra-white signals is provided on a remote controller of a television. When an image contains ultra-black signals or ultra-white signals needing to be outputted, a signal output range of the television is switched through manipulating the switch, so as to normally output the ultra-black signals or the ultra-white signals.

However, in the above case, only when a user is aware that the current image includes ultra-black signals or ultra-white signals (e.g., indicated in a video source), the user can then initiatively use the remote controller for manual adjustment. Yet, in actual conditions, many video sources lack the above indication, and so a user cannot accordingly and timely perform the adjustment.

Further, even if a user timely performs the adjustment, the normal signal output range of the television at this point is changed. However, because the normal signal output range of the electronic device is 64 to 940, wherein 64 corresponds to a darkest level of the screen and 940 corresponds to a brightest level of the screen. Assume a user manually adjusts the screen to display ultra-black signals and ultra-white signals, e.g., adjusting the signal output range of the television to 0 to 1023, wherein 0 corresponds to the darkest level of the screen and 1023 corresponds to the brightest level of the screen. At this point, if the signal is within the normal signal output range 64 to 940, 64 no longer corresponds to the darkest level of the screen and 940 likewise no longer corresponds to the brightest level of the screen. As such, adjustment needs to be again performed through the remote controller to restore the signal output range of the electronic device back to the original range 64 to 940 so as to obtain optimal display effects. In case of untimely adjustment, unfavorable influences are nonetheless generated upon display effects, thereby affecting user visual experience. Therefore, it is apparent that the above of the prior art brings users with numerous unnecessary complications.

The technical solutions of the present application are elaboratively and thoroughly described in the embodiments with the accompanying drawings below. It should be noted that, the described embodiments are only some but not all possible embodiments of the present application. On the basis of the embodiments of present application, any embodiments derived by a person skilled in the art without involving any inventive skills are to be encompassed within the scope of the present application.

FIG. 1 shows a flowchart of an image processing method of an electronic device according to an embodiment of the present invention. The electronic device of the present application is capable of processing an image and outputting the processed image through a screen. More specifically, the electronic device can be a television, a display, or an electronic device having the above functions.

In the present application, description is given by taking a color television receiving luminance signals in the YCbCr color space as an example. It should be noted that, the electronic device is not limited a television, and the color space is not limited to a YCbCr color space as in the above example, but can be RGB, CMY, HSV and HIS color spaces.

More specifically, the image processing method of an electronic device of the present application includes the following steps.

In step S11, an image to be processed is received, and it is determined whether the image to be processed is a non-standard image.

The image to be processed is stored locally in the electronic device or is received from an external terminal, and is an image to be outputted after undergoing processing of the electronic device. More specifically, the image to be processed can be a still and single image, or can be a frame in a video file.

A non-standard image is relative to a normal signal output range of the electronic device. As previously described, an electronic device has a signal output range when outputting an image. In the image to be processed, signals within the signal output range 64 to 940 can be normally outputted, whereas signals outside the signal output range, e.g., ultra-black signals and ultra-white signals, cannot be normally outputted by the electronic device. Thus, the image to be processed including signals outside the normal signal output range is considered as a non-standard image.

In one applications scenario, it is determined whether the image to be processed includes the signals outside the signal output range of the electronic device, and if so, it is considered that the image to be processed is a non-standard image. Alternatively, it is determined whether a ratio of the signals outside the signal output range in the image to be processed exceeds a predetermined value, and if so, the image to be processed is considered as a non-standard image. It should be noted that, other determination methods can be adopted in other application scenarios.

Figure 2:
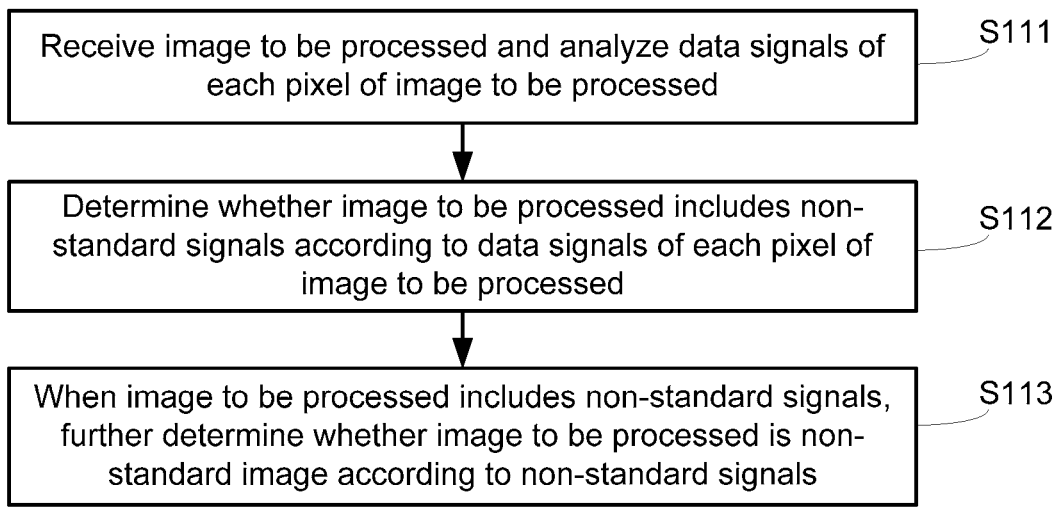
FIG. 2 is a flowchart of step S11 in FIG. 1.

More specifically, referring to FIG. 2, in one embodiment, step S11 further includes the following steps.

In step S111, an image to be processed is received, and data signals of pixels in the image to be processed are analyzed.

It is understandable that the image to be processed includes multiple pixels, each of the pixels carries data signals, and the Y signal of each pixel is within a global signal range 0 to 1023.

After the electronic device receives the image to be processed, the pixels in the image can be analyzed to obtain the data signals of the pixels, e.g., the range where the data signals of the pixels are located.

In step S112, it is determined whether the image to be processed includes a non-standard signal according to the data signals of the pixels in the image to be processed.

After the electronic device obtains the data signals of the pixels according to the pixels of the image, it can be determined whether the data signals of the pixels are located outside the signal output range of the electronic device.

Usually, when the data signals of the pixels of the image to be processed are all within the signal output range of the electronic device, it can be determined that the image to be processed does not include any non-standard signals and is thus a standard image. Hence, the image to be processed can be normally outputted by the electronic device without having to undergo any other additional processing. However, when there are data signals of the pixels of the image to be processed outside the signal output range of the electronic device, the pixels outside the signal output range of the electronic device can be further analyzed to determine whether the image to be processed is a non-standard image.

In step S113, when the image to be processed includes non-standard signals, it is further determined whether the image to be processed is a non-standard image according to the non-standard signals.

With the above analysis and determination, in one application scenario, when the image to be processed includes non-standard signals, it can be accordingly determined that the image to be processed is a non-standard image.

However, it should be noted that, during the process of analyzing the image to be processed, misjudgment can be resulted due to interference from such as signal lines, transmission process and ambient environmental. To enhance the determination accuracy, when it is determined that the image to be processed includes non-standard signals, it can be further determined whether the image to be processed is a non-standard image according to a ratio of the of the count of pixels of the non-standard signals.

Figure 3:
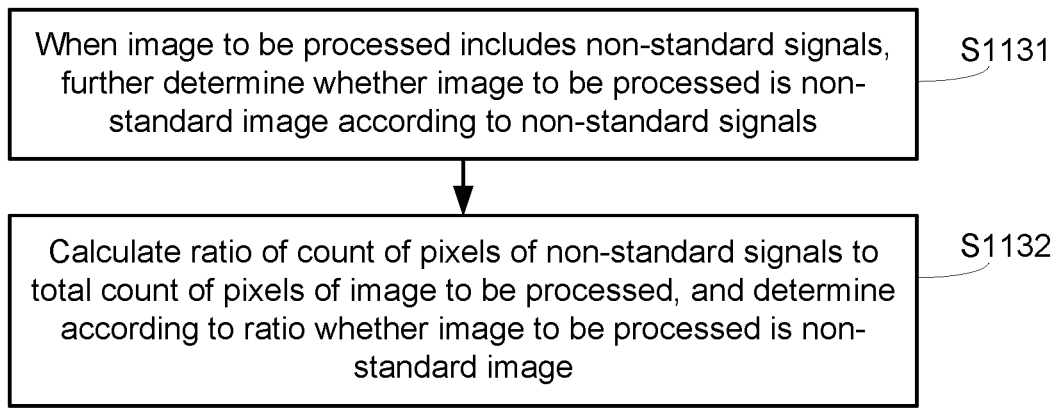
FIG. 3 is a flowchart of step S113 in FIG. 2.

More specifically, referring to FIG. 3, in one embodiment, step S113 further comprises the following steps.

In step S1131, when the image to be processed includes non-standard signals, a total count of the pixels of the image to be processed and a count of the pixels of the non-standard signals are calculated.

The total count of the pixels in the image to be processed is usually certain. Taking the playback of a video of a DVD for example, signals enter a television through an HDMI, wherein the resolution of signals from the DVD is 1920*1080P, and the total count of the pixels in the image to be processed is thus 1920*1080=2073600.

The count of the pixels of the non-standard signals is the count of pixels outside the signal output range of the electronic device. In the above color television system, the count of the pixels of the non-standard signals is the count of pixels within the range 0 to 63 or 941 to 1023. The count of the pixels of the non-standard signals needs to be calculated by the electronic device.

In this embodiment, the count of the pixels within the range 0 to 63 is 62249, and the count of the pixels within the range 941 to 1023 is 0.

In step S1132, a ratio of the count of the pixels of the non-standard signals to the total count of the pixels of the image to be processed is calculated, and it is accordingly determined whether the image to be processed is a non-standard image.

It should be noted that, in this embodiment, a threshold can be pre-configured, wherein the threshold represents an error due to interference received by the electronic device while the data signals of the pixels of the image to be processed are analyzed.

After the ratio of the count of the pixels of the non-standard signals to the total count of the pixels of the image to be processed is obtained, the ratio can be compared with the pre-configured threshold. When the ratio is greater than the threshold, it is considered that pixels of non-standard signals still exist after external interference is eliminated, and it can be further determined at this point that the image to be processed is a non-standard image. When the ratio is smaller than the threshold, as the interference is within the error range, it can be determined that the detected non-standard signals are generated due to interference, and the image to be processed is not considered as a non-standard image.

It should be noted that, the pre-configured threshold can be acquired on the basis of extensive tests. For example, in this application example, the threshold is 1%.

After the total count of the pixels of the image to be processed and the count of the pixels of the non-standard signals are obtained, it is obtained that the ratio of the count of the pixels of the non-standard signals to the total count of the pixels of the image to be processed is 62249/20736003%, and 3%>1%. Therefore, in this application example, the image to be processed is considered as a non-standard image.

It should be noted that, other determination methods can be adopted in other embodiments, and the determination method is specifically limited herein.

In step S12, when the determination result is affirmative, the image to be processed as a non-standard image is automatically converted into a standard image adapted to the signal output range of the electronic device.

Because the image to be processed as a non-standard image includes signals outside the signal output range of the electronic device and cannot be normally outputted, the display effects are of the image to be processed are affected. In the present application, after it is determined that the image to be processed is a non-standard image, the image to be processed is automatically converted into a standard image adapted to the signal output range of the electronic device, allowing the non-standard image to be normally outputted through the electronic device without involving any manual operation of a user.

More specifically, during the conversion, all signals of the non-standard image are converted through a specific means to signals within the signal output range of the electronic device. For example, in the above television, the ultra-black signals within the range 0 to 63 and the ultra-white signals within the range 941 to 1023, as well as the signals within the range 64 to 940 and can be normally outputted, are all converted to be within the range 64 to 940, thereby displaying all of the signals of the non-standard image, accordingly providing more realistic and saturated image display and enhancing display quality.

Details of the conversion are not specifically limited herein.

Figure 4:
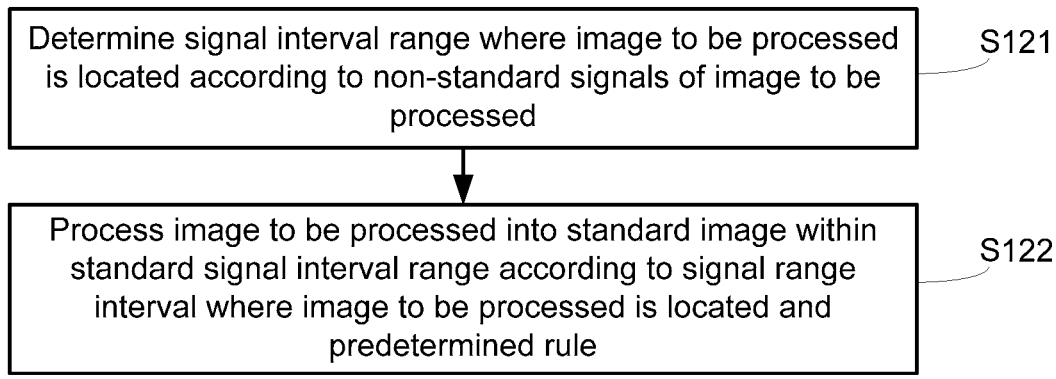
FIG. 4 is a flowchart of step S12 in FIG. 1.

In one application scenario, referring to FIG. 4, step S12 further includes the following step.

In step S121, a signal interval range where the image to be processed is located is determined according to the non-standard signals of the image to be processed.

The signal interval range of the image to be processed refers to a signal interval range of all signals of the image to be processed. More specifically, the signal interval range can be a range determined by the electronic device.

In one application example, the television can output Y signals in a 64 to 940 signal range in the YCbCr color space, and in the image to be processed, the count of the pixels within the 0 to 63 signal range is 62249 and the count of pixels within the 941 to 1023 is 0. Thus, at this point, the signal interval range of the image to be processed is determined as 0 to 940. The above is a rough range. For example, in the signal range 0 to 63, some signal intervals may not include any pixels, e.g., no pixels exist in the range 0 to 31. At this point, the above range can be reduced to enhance the accuracy.

Figure 5:
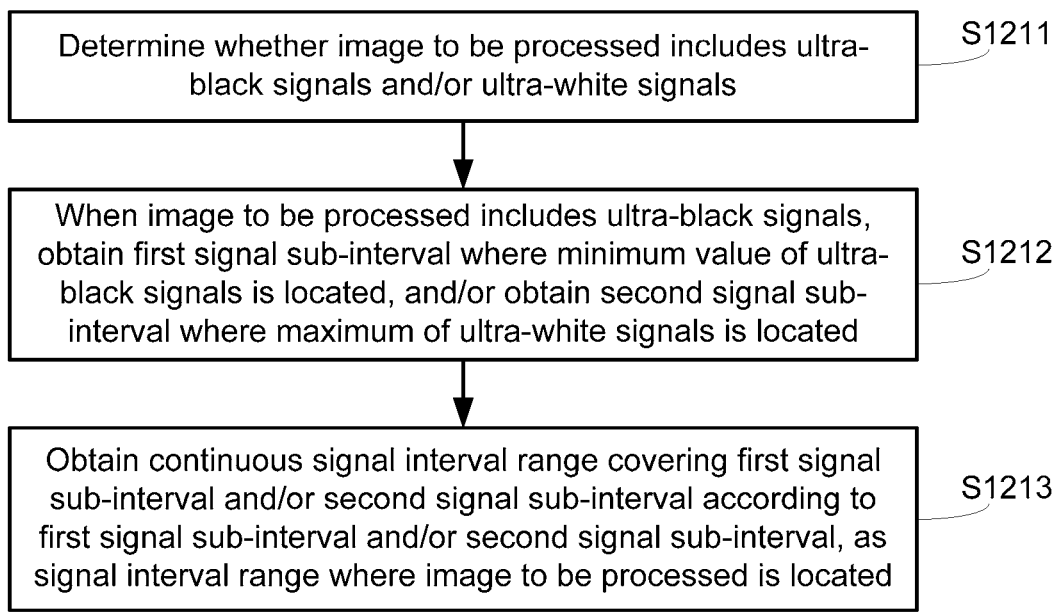
FIG. 5 is a flowchart of step S121 in FIG. 4.

In one application scenario, referring to FIG. 5, step S121 further includes the following steps.

In step S1211, it is determined whether the image to be processed includes ultra-black and/or ultra-white signals.

In the present application, the non-standard signals of the image to be processed include both ultra-black signals and ultra-white signals. Thus, when the image to be processed does not include any of the ultra-black signals and the ultra-white signals, the image to be processed does not include non-standard signals.

In this application example, it can be determined whether the image to be processed includes signals within ranges of 0 to 63 and 941 to 1023, and it is determined that the image to be processed includes ultra-black signals and/or ultra-white signals when signals exists in either of the two ranges.

In step S1212, when the image to be processed includes ultra-black signals, a first signal sub-interval where a minimum value of the ultra-black signals is located is obtained, and/or when the image to be processed includes ultra-white signals, a second signal sub-interval where a maximum value of the ultra-white signals is located is obtained.

Because both ultra-black signals and ultra-white signals are within certain ranges, the final determined accuracy can be affected if the ranges are directly used to determine the signal interval range where the image to be processed is located. To enhance the accuracy of image processing and to achieve better display effects, in the present application, the range of ultra-black signals and the range of ultra-white signals are further finely divided to obtain a corresponding first sub-interval and a corresponding second sub-interval, and the signal interval range where the image to be processed is located is determined according to the first signal sub-interval and the second signal sub-interval.

In this application example, ranges of 0 to 63 and 941 to 1023 are divided into different sub-intervals. For example, the range 0 to 63 is divided into two sub-intervals 0 to 31 and 32 to 63, and the range 941 to 1023 is divided into two sub-intervals 941 to 972 and 973 to 1023.

Further, in the present invention, after the signal intervals range where the image to be processed is obtained, since ultra-black signals correspond to smaller signals in the global signal range, the sub-interval corresponding to the minimum ultra-black can be directly obtained during determination.

For example, assume that in the image to be processed, corresponding pixels exist in the sub-interval 32 to 63, and no corresponding pixels exist in the sub-interval 0 to 31. Thus, the signal interval range where the image to be processed is located can be obtained according to the range corresponding to the sub-interval 32 to 63. At this point, the sub-interval 32 to 63 is the first signal sub-interval where the minimum value of the ultra-black signals is located. Assume that in the image to be processed, corresponding pixels exist in the sub-interval 0 to 31 and no corresponding pixels exist in the sub-interval 32 to 63. Thus, the signal interval range where the image to be processed is located can be obtained according to the range corresponding to the sub-interval 0 to 31. At this point, the sub-interval 0 to 31 is the first signal sub-interval where the minimum value of the ultra-black signals is located, and it is not required to further search the sub-interval 32 to 63 to determine whether any corresponding pixels exist.

Conversely, when the sub-interval corresponding to the ultra-white signals are obtained, the sub-interval corresponding to the maximum value of the ultra-white signals can be directly obtained. Associated details are similar to those for the ultra-black signals, and are omitted herein.

In step S1213, a continuous signal interval range covering the first signal sub-interval and/or the second sub-interval is obtained according to the first signal sub-interval and/or the second signal sub-interval, as the signal interval range where the image to be processed is located.

In the present application, the obtained signal interval range of the image to be processed is a real range where the image to be processed is located, and the range is specifically a continuous range covering the first signal sub-interval and/or the second signal sub-interval and the signal output range of the electronic device.

For example, in the image to be processed, when corresponding pixels exist in both the first signal sub-intervals 0 to 31 and 32 to 63 and no corresponding pixels exist in the second signal sub-intervals 941 to 972 and 973 to 1023, the first signal sub-interval is 0 to 63 and there is no second signal sub-interval. At this point, the signal interval range where the image to be processed is located is 0 to 940, which covers the first signal sub-interval and the signal output range of the electronic device.

For another example, in the image to be processed, when corresponding pixels exist in the sub-interval 0 to 31 and no corresponding pixels exist the sub-interval 32 to 63, the sub-interval 941 to 972 and the sub-interval 973 to 1023, the first signal sub-interval is similarly 0 to 63, and the signal interval range where the image to be processed is 0 to 940.

In this embodiment, to obtain the signal interval range where the image to be processed is located, instead of sequentially obtaining the sub-intervals where all ultra-black signals and/or ultra-white signals are located, only the first signal sub-interval where the minimum value of the ultra-black signals is located and/or the second signal sub-interval where the maximum of the ultra-white signals is located need(s) to be obtained, such that the data size processed by the electronic device can be reduced to increase the processing speed. Meanwhile, by further dividing the signal range of ultra-black signals and the signal range of ultra-white signals, the precision of the signal interval range where the image to be processed can be increased to thereby improve image display effects.

In step S122, the image to be processed is processed according to the signal interval range where the image to be processed is located and a predetermined rule into a standard image within a standard signal interval range.

The predetermined rule is a pre-configured method adopted for converting the real range where the image to be processed as a non-standard image is located into a standard image within a standard signal interval range.

Figure 6:
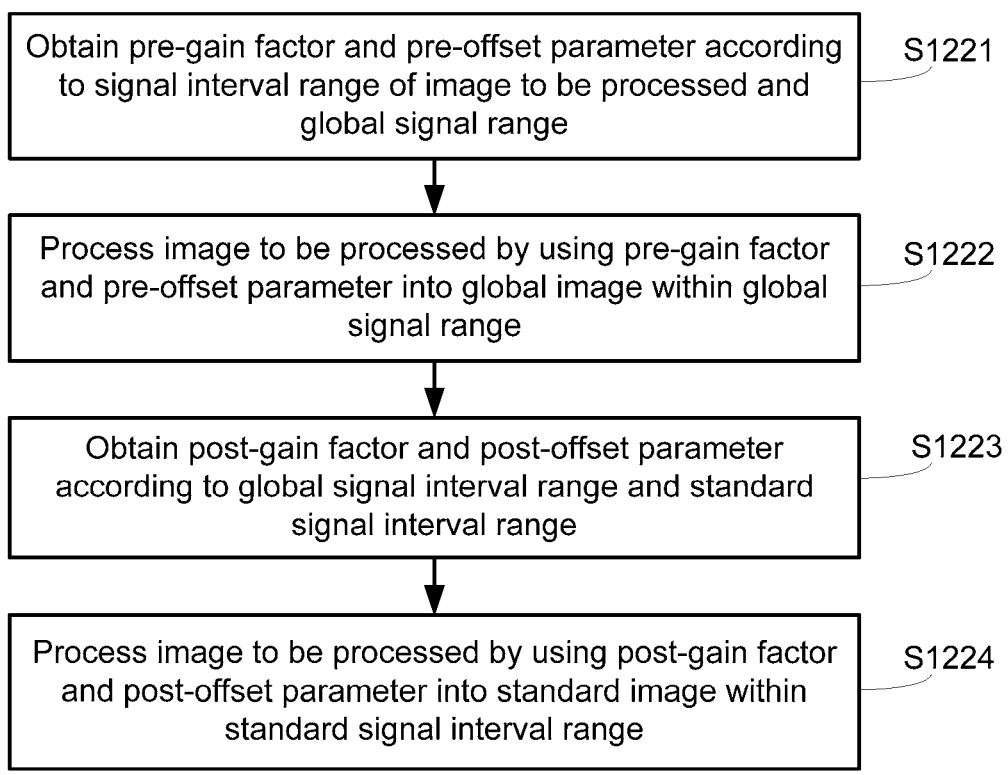
FIG. 6 is a flowchart of step S122 in FIG. 4.

Referring to FIG. 6, in one embodiment, step S122 further includes the following steps.

In step S1221, a pre-gain factor and a pre-offset parameter are obtained according to the signal interval range where the image to be processed is located and the global signal range.

The pre-gain factor and the pre-offset parameter are parameters used for converting the signal interval range of the image to be processed into the global signal range, and the electronic device can sequentially convert the signals of the image to be processed into signals of the corresponding global signal range according to the obtained pre-gain factor and pre-offset parameter.

Figure 7:
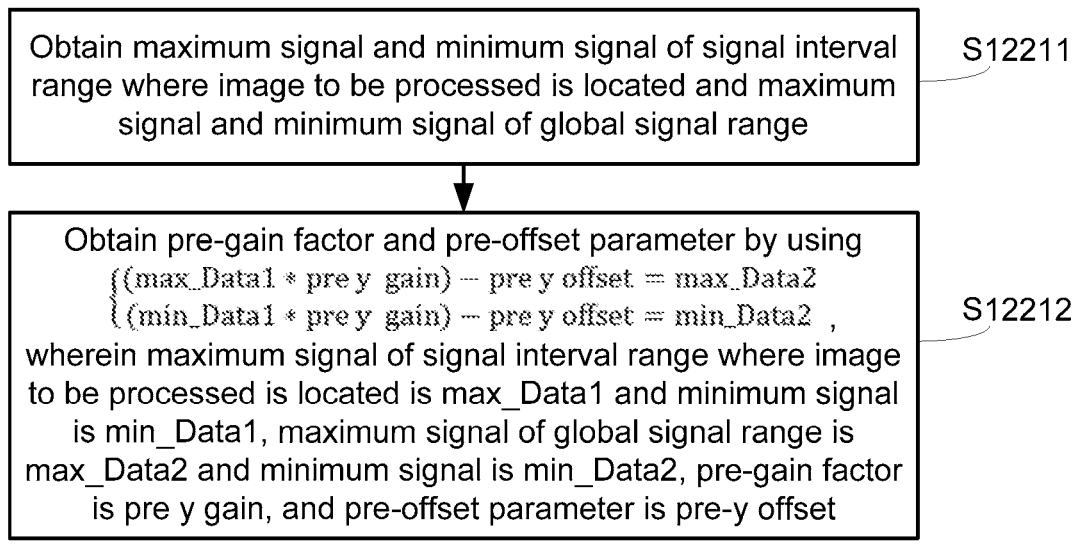
FIG. 7 is a flowchart of step S1221 in FIG. 6.

More specifically, referring to FIG. 7, in one embodiment, step S1221 further includes the following steps.

In step S12211, a maximum signal and a minimum signal of the signal interval range where the image to be processed is located and a maximum signal and a minimum signal of the global signal range are obtained.

The signal interval range where the image to be processed is located can be obtained in step S1213, and the maximum signal and the minimum signal of the signal interval range where the image to be processed is located can be correspondingly obtained.

For example, assuming that the signal interval range where the image to be processed is located is 0 to 940, at this point, the maximum signal of the signal interval range where the image to be processed is located is max_Data1=940 and the minimum signal is min_Data1=0.

The global signal range corresponds to the corresponding range to the color space adopted by the electronic device, and different color spaces adopted can correspond to different global signal ranges, so as to correspond to maximum signals and minimum signals corresponding to different global signal ranges. In this application example, for example, the global signal range is 0 to 1023, and the maximum signal max_Data2=1023 and the minimum signal min_Data2=0 of the global signal range at this point.

In step S12212, the pre-gain factor and the pre-offset parameter are obtained according to $$\begin{cases} (\text{max\_Data1} * \text{pre } y \text{ gain}) - \text{pre } y \text{ offset} = \text{max\_Data2} \\ (\text{min\_Data1} * \text{pre } y \text{ gain}) - \text{pre } y \text{ offset} = \text{min\_Data2} \end{cases},$$

wherein the maximum signal of the signal interval range where the image to be processed is located is max_Data1 and the minimum signal is min_Data1, the maximum signal of the global signal range is max_Data2 and the minimum signal is min_Data2, the pre-gain factor is "pre y gain", and the pre-offset parameter is "pre y offset".

Given max_Data1 and min_Data1 of the signal interval range where the image to be processed is located and max_Data2 and min_Data2 of the global signal range, it can be easily obtained according to the above equations that the corresponding pre-gain factor is "pre y gain" and the corresponding pre-offset parameter is "pre y offset".

In step S1222, the image to be processed is processed according to the pre-gain factor and the pre-offset parameter into a global image located in the global signal range.

More specifically, after the pre-gain factor "pre y gain" and the pre-offset parameter "pre y offset" are obtained, the image to be processed can be converted by using the equation (Data2=(Data1*pre y gain)−pre y offset) into a global image corresponding to the global signal range, where Data1 is a signal corresponding to the signal interval range of the image to be processed, and Data2 is a signal corresponding to the global signal range and converted from Data1.

In one application scenario, the image to be processed as a non-standard image includes ultra-black signals and ultra-white signals, wherein the first signal sub-interval where the ultra-black signals are located is 0 to 31, and the second signal sub-interval where the ultra-white signals are located is 973 to 1023, and so the signal interval range where the image to be processed is 0 to 1023 and is consistent with the global signal range. At this point, original signals of the image to be processed can be used as processed signals corresponding to the global signal range without undergoing further calculation, thus alleviating the work load of the electronic device and increasing the image processing speed.

In step S1223, a post-gain factor and a post-offset parameter are obtained according to the global signal range and the standard signal interval range.

Similar to the above pre-gain factor and pre-offset parameter, the post-gain factor and the post-offset parameter are parameters used for converting the global image corresponding to the global signal range into a standard image corresponding to the standard signal interval range. The electronic device sequentially converts the signals of the image to be processed according to the obtained post-gain factor and post-offset parameter into signals corresponding to the standard signal interval range.

Figure 8:
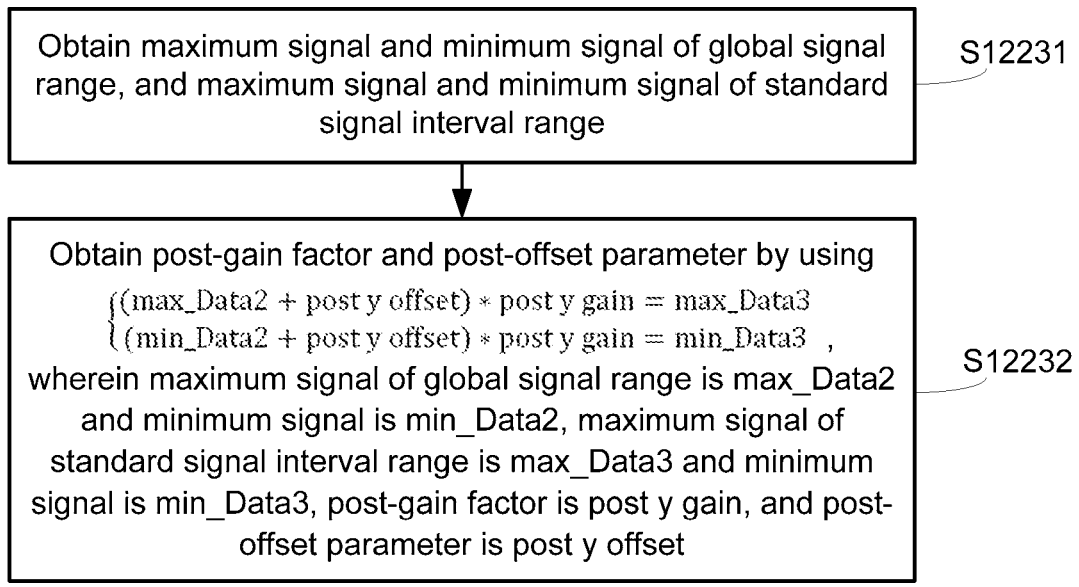
FIG. 8 is a flowchart of step S1223 in FIG. 6.

More specifically, referring to FIG. 8, in one embodiment, step S1223 further includes the following steps.

In step S12231, a maximum signal and a minimum signal of the global signal range, and a maximum and a minimum signal of the standard signal interval range are obtained.

The standard signal interval range corresponds to the signal output range of the electronic device, i.e., the signal range corresponding to a standard image, and is specifically, 64 to 940 as above. At this point, the maximum signal of the standard signal interval range is max_Data3=940 and the minimum signal m in_Data3=64.

In step S12232, the post-gain factor and the post-offset parameter are obtained according to $$\begin{cases} (\text{max\_Data2} + \text{post } y \text{ offset}) * \text{post } y \text{ gain} = \text{max\_Data3} \\ (\text{min\_Data2} + \text{post } y \text{ offset}) * \text{post } y \text{ gain} = \text{min\_Data3} \end{cases},$$

wherein the maximum signal of the global signal range is max_Data2 and the minimum signal is min_Data2, the maximum signal of the standard signal range is max_Data3 and the minimum signal is min_Data3, the post-gain factor is "post y gain", and the post-offset parameter is "post y offset".

Given max_Data2 and min_Data2 of the global signal range and max_Data3 and min_Data3 of the standard signal range, it can be easily obtained according to the above equations that the corresponding post-gain factor is "post y gain" and the corresponding post-offset parameter is "post y offset".

In step S1224, the image to be processed is processed by using the post-gain factor and the post-offset parameter into a standard image located in the standard signal interval range.

More specifically, after the post-gain factor "post y gain" and the post-offset parameter "post y offset" are obtained, the global image corresponding to the global signal range can be converted by using the equation (Data3=(Data2+post y offset)*post y gain) into a standard image corresponding to the standard signal interval, wherein Data2 is a signal corresponding to the global signal range, and Data3 is a signal corresponding to the standard signal range and converted from Data2.

In step 13, the standard image is outputted.

In the present application, after the image to be processed as a non-standard image is converted into a standard image adapted to the signal output range of the electronic device, the electronic device outputs the converted standard image.

With the above method, in the present invention, when the electronic device processes an image, a non-standard image that cannot be normally outputted can be automatically converted into a standard image and be outputted without involving manual adjustment of a user, thereby improving image output effects of the electronic device and satisfying user utilization requirements.

Figure 9:
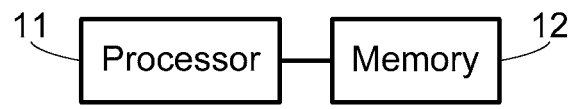
FIG. 9 is a structural schematic diagram of an electronic device according to an embodiment of the present application.

FIG. 9 shows a structural schematic diagram of an electronic device according to an embodiment of the present application. In the present application, the electronic device can be a device such as a television or a display having an image processing capability. The electronic device includes a processor 11 and a memory 12. The processor 11 is coupled to the memory 12. The memory 12 is stored with an image processing program. When the image processing program is executed by the processor 11, the processor 11 performs the steps in FIG. 1 to FIG. 8 of the above embodiments, with the associated details omitted herein. It should be noted that, the effects achieved by the steps performed by the electronic device of this embodiment are identical to those of the method of the above image processing method of an electronic device of the present application, and associated details can be referred from the description of the above embodiments and are thus omitted herein.

While the present application has been described by way of example and in terms of the preferred embodiments, it is to be understood that the present application is not limited thereto. On the contrary, it is intended to cover various modifications and similar arrangements and procedures, and the scope of the appended claims therefore should be accorded with the broadest interpretation so as to encompass all such modifications and similar arrangements and procedures.

What is claimed is:

1. An image processing method of an electronic device, comprising:
   receiving an image to be processed, and determining whether the image to be processed is a non-standard image;
   when a determination result is affirmative, automatically converting the image to be processed as the non-standard image into a standard image adapted to a signal output range of the electronic device;
   wherein the step of automatically converting the image to be processed as the non-standard image into the standard image adapted to the signal output range of the electronic device further comprises:
   determining a signal interval range where the image to be processed is located according to a non-standard signal of the image to be processed; and
   processing the image to be processed according to the signal interval range where the image to be processed is located and a predetermined rule into the standard image within a standard signal interval range;
   wherein the step of processing the image to be processed according to the signal interval range where the image to be processed is located and the predetermined rule into the standard image within the standard signal interval range comprises:
   obtaining a pre-gain factor and a pre-offset parameter according to the signal interval range where the image to be processed is located and a global signal range;
   processing the image to be processed by using the pre-gain factor and the pre-offset parameter into a global image within the global signal range;
   obtaining a post-gain factor and a post-offset parameter according to the global signal range and the standard signal interval range; and
   processing the image to be processed by using the post-gain factor and the post-offset parameter into the standard image with the standard signal interval range.

2. The method according to claim 1, wherein the step of determining the signal interval range where the image to be processed is located according to the non-standard signal of the image to be processed further comprises:
   determining whether the image to be processed comprises an ultra-black signal and/or an ultra-white signal;
   when the image to be processed comprises the ultra-black signal, obtaining a first signal sub-interval where a minimum value of the ultra-black signal is located; and/or
   when the image to be processed comprises the ultra-white signal, obtaining a second signal sub-interval where a maximum value of the ultra-white signal is located; and
   obtaining a continuous signal interval range covering the first signal sub-interval and/or the second signal sub-interval according to the first signal sub-interval and/or the second signal sub-interval, as the signal interval range where the image to be processed is located.

3. The method according to claim 1, wherein the step of obtaining the pre-gain factor and the pre-offset parameter according to the signal interval range where the image to be processed is located and the global signal range comprises:
   obtaining a maximum signal and a minimum signal of the signal interval range where the image to be processed is located, and a maximum signal and a minimum signal of the global signal range;
   obtaining the pre-gain factor and the pre-offset parameter according to $$\begin{cases} (\text{max\_Data1} * \text{pre } y \text{ gain}) - \text{pre } y \text{ offset} = \text{max\_Data2} \\ (\text{min\_Data1} * \text{pre } y \text{ gain}) - \text{pre } y \text{ offset} = \text{min\_Data2} \end{cases},$$

wherein the maximum signal of the signal interval range where the image to be processed is max_Data1 and the minimum signal is min_Data1, the maximum signal of the global signal range is max_Data2 and the minimum signal is min_Data2, the pre-gain factor is "pre y gain", and the pre-offset parameter is "pre y offset".

4. The method according to claim 1, wherein the step of obtaining the post-gain factor and the post-offset parameter according to the global signal range and the standard signal interval range further comprises:
   obtaining a maximum signal and a minimum signal of the global signal range, and a maximum signal and a minimum signal of the standard signal interval range; and
   obtaining the post-gain factor and the post-offset parameter according to $$\begin{cases} (\text{max\_Data2} + \text{post } y \text{ offset}) * \text{post } y \text{ gain} = \text{max\_Data3} \\ (\text{min\_Data2} + \text{post } y \text{ offset}) * \text{post } y \text{ gain} = \text{min\_Data3} \end{cases},$$

wherein the maximum signal of the global signal range is max_Data2 and the minimum signal is min_Data2, the maximum signal of the standard signal range is max_Data3 and the minimum signal is min_Data3, the post-gain factor is "post y gain", and the post-offset parameter is "post y offset".

5. The method according to claim 1, wherein the step of receiving the image to be processed and determining whether the image to be processed is the non-standard image further comprises:
   receiving the image to be processed, and analyzing data signals of each pixel of the image to be processed;
   determining whether the image to be processed comprises a non-standard signal according to the data signals of each pixel of the image to be processed; and
   when the image to be processed comprises the non-standard signal, determining whether the image to be processed is the non-standard image further according to the non-standard signal.

6. The method according to claim 5, wherein the step of when the image to be processed comprises the non-standard signal, determining whether the image to be processed is the non-standard image further according to the non-standard signal comprises:

when the image to be processed comprises the non-standard signal, calculating a total count of pixels of the image to be processed and a count of pixels of the non-standard signal; and calculating a ratio of the count of the pixels of the non-standard signal to the total count of the pixels of the image to be processed, and determining according to the ratio whether the image to be processed is the non-standard image.

7. An electronic device, comprising a processor and a memory, the processor coupled to the memory, the memory stored with an image processing program, the processor performing steps below when the image processing program is executed by the processor:

receiving an image to be processed, and determining whether the image to be processed is a non-standard image;

when a determination result is affirmative, automatically converting the image to be processed as the non-standard image into a standard image adapted to a signal output range of the electronic device;

wherein when performing the step of automatically converting the image to be processed as the non-standard image into the standard image adapted to the signal output range of the electronic device, the processor further performs steps of:

determining a signal interval range where the image to be processed is located according to a non-standard signal of the image to be processed; and processing the image to be processed according to the signal interval range where the image to be processed is located and a predetermined rule into the standard image within a standard signal interval range;

wherein when performing the step of processing the image to be processed according to the signal interval range where the image to be processed is located and the predetermined rule into the standard image within the standard signal interval range, the processor further performs steps of:

obtaining a pre-gain factor and a pre-offset parameter according to the signal interval range where the image to be processed is located and a global signal range;

processing the image to be processed by using the pre-gain factor and the pre-offset parameter into a global image within the global signal range;

obtaining a post-gain factor and a post-offset parameter according to the global signal range and the standard signal interval range; and processing the image to be processed by using the post-gain factor and the post-offset parameter into the standard image with the standard signal interval range.

8. The electronic device according to claim 7, wherein when performing the step of determining the signal interval range where the image to be processed is located according to the non-standard signal of the image to be processed, the processor further performs steps of:

determining whether the image to be processed comprises an ultra-black signal and/or an ultra-white signal;

when the image to be processed comprises the ultra-black signal, obtaining a first signal sub-interval where a minimum value of the ultra-black signal is located; and/or when the image to be processed comprises the ultra-white signal, obtaining a second signal sub-interval where a maximum value of the ultra-white signal is located; and obtaining a continuous signal interval range covering the first signal sub-interval and/or the second signal sub-interval according to the first signal sub-interval and/or the second signal sub-interval, as the signal interval range where the image to be processed is located.

9. The electronic device according to claim 7, wherein when performing the step of obtaining the pre-gain factor and the pre-offset parameter according to the signal interval range where the image to be processed is located and the global signal range, the processor further performs steps of:

obtaining a maximum signal and a minimum signal of the signal interval range where the image to be processed is located, and a maximum signal and a minimum signal of the global signal range; and obtaining the pre-gain factor and the pre-offset parameter according to $$\begin{cases} (\text{max\_Data1} * \text{pre } y \text{ gain}) - \text{pre } y \text{ offset} = \text{max\_Data2} \\ (\text{min\_Data1} * \text{pre } y \text{ gain}) - \text{pre } y \text{ offset} = \text{min\_Data2} \end{cases},$$

wherein the maximum signal of the signal interval range where the image to be processed is max_Data1 and the minimum signal is min_Data1, the maximum signal of the global signal range is max_Data2 and the minimum signal is min_Data2, the pre-gain factor is "pre y gain", and the pre-offset parameter is "pre y offset".

10. The electronic device according to claim 7, wherein when performing the step of obtaining the post-gain factor and the post-offset parameter according to the global signal range and the standard signal interval range, the processor further performs steps of:

obtaining a maximum signal and a minimum signal of the global signal range, and a maximum signal and a minimum signal of the standard signal interval range; and obtaining the post-gain factor and the post-offset parameter according to $$\begin{cases} (\text{max\_Data2} + \text{post } y \text{ offset}) * \text{post y gain} = \text{max\_Data3} \\ (\text{min\_Data2} + \text{post } y \text{ offset}) * \text{post y gain} = \text{min\_Data3} \end{cases},$$

wherein the maximum signal of the global signal range is max_Data2 and the minimum signal is min_Data2, the maximum signal of the standard signal range is max_Data3 and the minimum signal is min_Data3, the post-gain factor is "post y gain", and the post-offset parameter is "post y offset".

11. The electronic device according to claim 7, wherein when performing the step of receiving the image to be processed and determining whether the image to be processed is the non-standard image, the processor further performs steps of:

receiving the image to be processed, and analyzing data signals of each pixel of the image to be processed;

determining whether the image to be processed comprises a non-standard signal according to the data signals of each pixel of the image to be processed; and when the image to be processed comprises the non-standard signal, determining whether the image to be processed is the non-standard image further according to the non-standard signal.

12. The electronic device according to claim 11, wherein when performing the step of determining whether the image to be processed is the non-standard image further according to the non-standard signal when the image to be processed comprises the non-standard signal, the processor further performs steps of:
- when the image to be processed comprises the non-standard signal, calculating a total count of pixels of the image to be processed and a count of pixels of the non-standard signal; and
- calculating a ratio of the count of the pixels of the non-standard signal to the total count of the pixels of the image to be processed, and determining according to the ratio whether the image to be processed is the non-standard image.

* * * * *